(12) United States Patent
Bates

(10) Patent No.: US 7,350,870 B2
(45) Date of Patent: Apr. 1, 2008

(54) INTEGRATED COMPENSATOR MODULE

(75) Inventor: Jeffrey David Bates, Birmingham (GB)

(73) Assignee: Capro, Ltd., Willis, TX (US)

( * ) Notice: Subject to any disclaimer, the term of this patent is extended or adjusted under 35 U.S.C. 154(b) by 418 days.

(21) Appl. No.: 10/754,132

(22) Filed: Jan. 9, 2004

(65) Prior Publication Data

US 2005/0127739 A1   Jun. 16, 2005

Related U.S. Application Data

(60) Provisional application No. 60/529,034, filed on Dec. 12, 2003.

(51) Int. Cl.
*A47B 31/00* (2006.01)
*F16C 1/10* (2006.01)

(52) U.S. Cl. .................................. 297/463.1; 74/501.6

(58) Field of Classification Search ............. 297/463.1, 297/463.2, 284.4, 344.1; 74/500.5, 469, 74/470, 502.2, 502.5, 502.6, 501.5 H, 502, 74/501.5 R, 501.6
See application file for complete search history.

(56) References Cited

U.S. PATENT DOCUMENTS

| | | | | | |
|---|---|---|---|---|---|
| 4,588,200 | A | * | 5/1986 | Kanamori | 280/269 |
| 4,724,675 | A | * | 2/1988 | Douillet | 60/581 |
| 5,107,720 | A | * | 4/1992 | Hatfield | 74/502 |
| 5,138,898 | A | * | 8/1992 | Pospisil et al. | 74/502.6 |
| 5,829,314 | A | * | 11/1998 | Scura | 74/502.4 |
| 5,878,626 | A | * | 3/1999 | Gutierrez | 74/500.5 |
| 2002/0088297 | A1 | * | 7/2002 | Lin | 74/500.5 |

* cited by examiner

*Primary Examiner*—Milton Nelson, Jr.
(74) *Attorney, Agent, or Firm*—Baker & Hostetler LLP

(57) ABSTRACT

An integrated compensator module that protects cable and conduit assemblies from excessive loading. Also, a primary cable and conduit assembly that transfers motion to a plurality of secondary cable and conduit assemblies. The conduit portions of the secondary cable and conduit assemblies are biased to relieve excessive loads on the secondary cable and conduit assemblies.

6 Claims, 2 Drawing Sheets

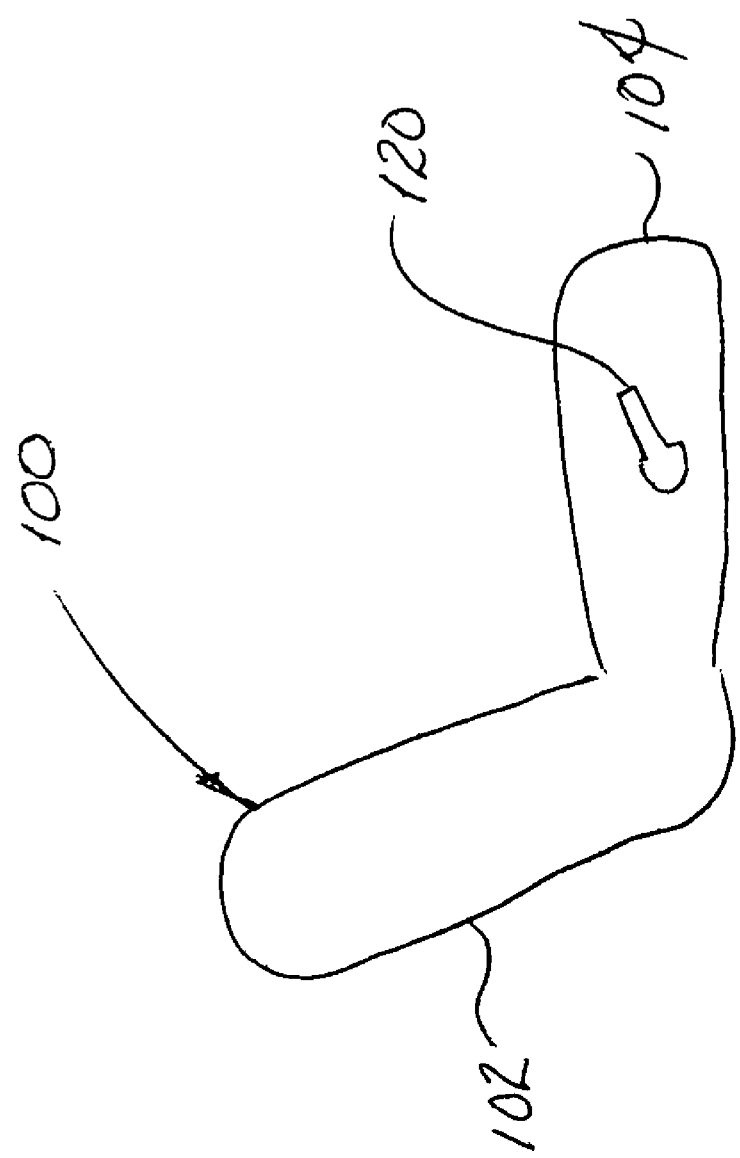

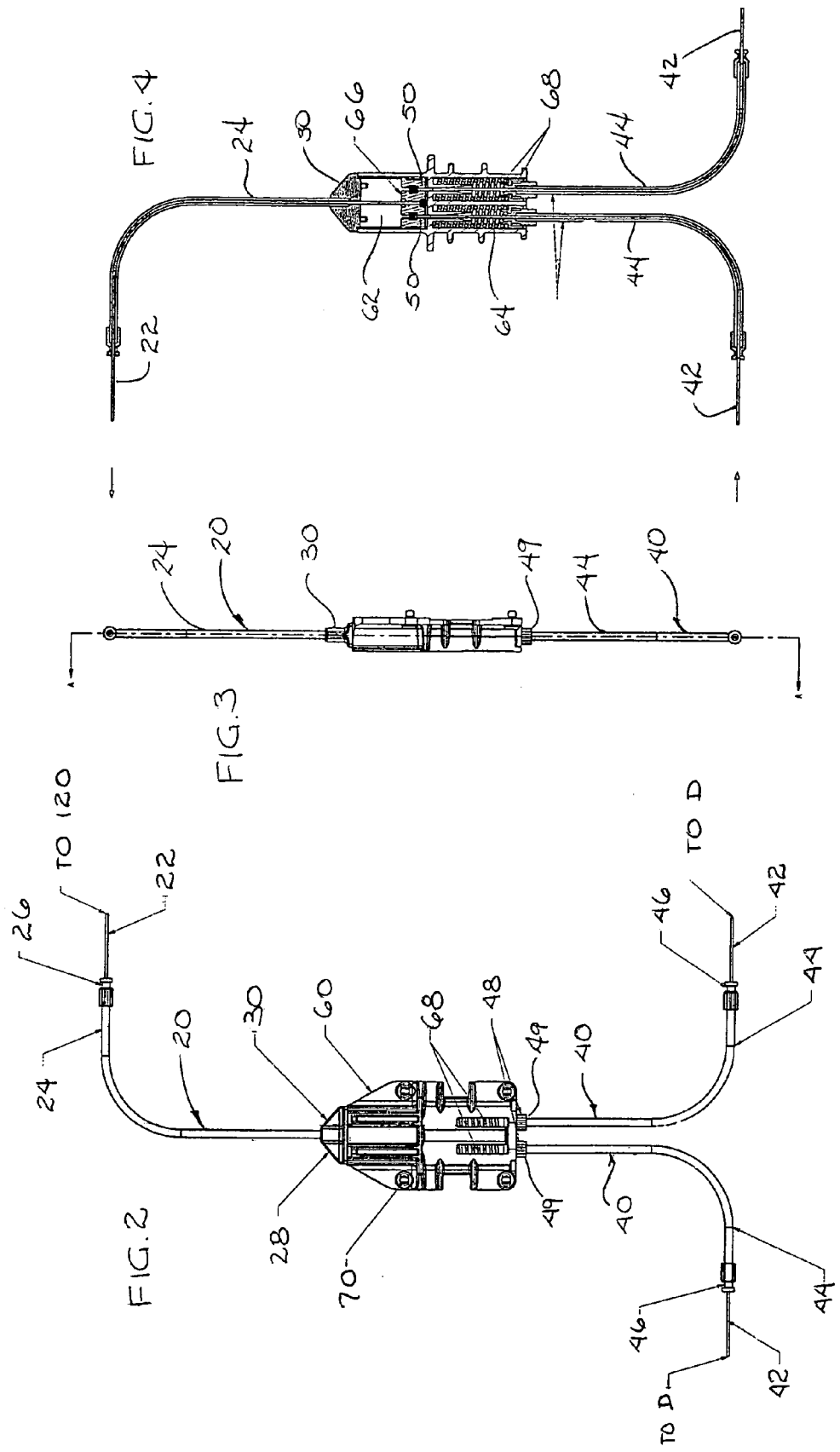

INTEGRATED COMPENSATOR MODULE

REFERENCE TO RELATED APPLICATION

This application claims priority from U.S. Provisional Patent Application Ser. No. 60/529,034 filed Dec. 12, 2003, titled "Integrated Compensator Module".

BACKGROUND OF THE INVENTION

1. Field

This invention pertains to a cable force activated assembly which transmits forces to other cables connected to mechanical latching or locking mechanisms as are often found vehicle seat position control and adjustment mechanisms.

2. Background

In recent years, a type of vehicle known as a sport utility vehicle (SUV) has become popular. The SUV offers its owner additional functionalities in addition to carrying passengers. Specifically, SUV's offer a large cargo space so that a single vehicle provides the utility of both a passenger vehicle and a small truck. Because the passenger seats must be moved to create cargo space, the passenger seats in SUV's must perform complex functions such as tilting, collapsing, sliding, etc. To accomplish these complex functions, sophisticated mechanical control mechanisms are required. Sophisticated mechanical control mechanisms present their own unique set of problems, such as packaging the mechanical componentry to enable maximum utilization of available space, protecting cables from wear and breakage caused by excessive loading, minimizing failure from variation in cable travel vehicle-to-vehicle, and transferring motion from a single cable to two or more cables.

SUMMARY

The disclosed integrated compensator module enables maximum utilization of available space, protects the cables from excessive loading, minimizes failure, while providing the basic functionality of transferring the force placed on a primary cable and conduit assembly to a plurality of secondary cables and conduit assemblies.

According to the present invention, the conduit portion of the primary cable and conduit assembly is attached at a fixed position to an integrated compensator box housing using a triangular shaped conduit fitting. Located within the integrated compensator box hollow housing are two portions. The first portion includes an open space through which a lost motion slider is allowed to move. The lost motion slider includes a slot for engaging a proximal end of the cable portion of the primary cable and conduit assembly. The lost motion slider also includes two or more slots for engaging the proximal ends of the cable portion of two or more secondary cables and conduit assemblies. Thus, when the lost motion slider is caused to move through the open space in the first portion of the integrated compensator hollow housing, a single force on the primary cable will be converted into multiple forces on two or more secondary cables by virtue of the attachment of both the primary cable and the two or more secondary cables to the lost motion slider.

As the lost motion slider moves through the open space in the integrated compensator box housing, the secondary cables are caused to move within the secondary conduits. Such motion places a compression force on the conduit portion of the secondary cable and conduit assemblies. The compression force on the conduit portion of the secondary cable and conduit assembly compresses the springs placed in the lower portion of the integrated compensator hollow housing and relieves the force on the cables.

The functionality of the integrated compensator module of the present invention is initiated by moving a primary lever or control. The movement of the primary lever or control applies a tensile load on the primary cable. This tensile load on the primary cable causes the lost motion slider to take up any slack in the primary and secondary cables. The lost motion slider then travels through the open space in the integrated compensator box housing and applies a load on the two or more secondary cables. The two or more secondary cables then transmit the tensile load on the primary cable to some type of a driven mechanism, be it a latch, a lock, or any type of mechanism whose condition is changed by the input of mechanical force.

Because of the tensile load placed on both the primary and the two or more secondary cables, the primary and secondary conduits surrounding the primary cable and secondary cables attempt to straighten out and experience a compression force. If the driven mechanism attached to the two or more secondary cables hits a design stop or incurs some unexpected obstacle which traps the movement of the cable prior to the primary lever reaching its full travel or design stop, an excessive load will be applied to the cables. This increase in the tensile load applied to the cables will increase the compression load on each of the conduits. When the compression load on the two or more secondary conduits is greater than the pre-load on the compression springs, the compression springs will compress and relieve the load on the cable. Such relief will prevent cable breakage and reduce cable wear.

BRIEF DESCRIPTION OF THE DRAWING FIGURES

A still better understanding of the system and method incorporated in the integrated compensator module of the present invention may be had by reference to the drawing figures, wherein:

FIG. 1 is a side elevational view of a vehicle seat; and

FIG. 2 is a front elevational view of the integrated compensator module;

FIG. 3 is a right side elevational view of the integrated compensator module; and FIG. 4 is an elevational view in partial section at line A-A of FIG. 3.

DESCRIPTION OF THE EMBODIMENTS

The integrated compensator module 10 of the present invention is typically used for controlling and adjusting the position of a vehicle seat assembly 100 using a manual control device such as a lever 120, as shown in FIG. 1. While the present invention has been disclosed as part of a vehicle seat system, typically including a back 102 and a seat 104, it may be used in a variety of different applications where there is a transfer of force from one cable and conduit assembly to another cable and conduit assembly. For example, the present invention may be used to control the opening of doors, hoods, and trunk lids, or it may be used to engage such systems as an emergency brake mechanism.

The construction and assembly of the integrated compensator module 10 of the present invention is shown in FIGS. 2, 3, and 4.

Beginning at the distal end of the primary cable 22, is a lever 120 or some other type of movement mechanism well known to those of ordinary skill in the art. The purpose of this lever 120 or movement mechanism is to provide an interface with the initiator of a mechanical force. Typically, the lever 120 or movement mechanism is constructed and arranged for contact with the hand of a person such that the lever 120 or movement mechanism will be caused to change position in response to force exerted by a person's hand. The force from the person's hand causes the lever 120 or movement mechanism to move, which places a tensile force on the primary cable 22.

The primary cable 22 is contained within a primary conduit 24 to form a primary cable and conduit assembly 20. At either end of the primary conduit 24 which surrounds the primary cable 22 are fixed points 26, 28. As shown in FIG. 2, fixed point 28 is contained in a triangular or delta fitting 30. Those of ordinary skill in the art will understand that a tensile force on one end of the primary cable 22 will exert a pulling force on whatever is connected to the opposite end of the primary cable 22. However, since the primary conduit 24 is effectively keeping what is on the opposite end of the primary cable 22 away from the end where force is applied, a tensile force on the primary cable 22 will result in a compression force on the primary conduit 24.

Moving now to the construction of the secondary cable and conduit assemblies 40, the construction is similar to the construction of the primary cable and conduit assembly 20. Specifically, the secondary cables 42 are constructed to transmit a tensile force to a driven mechanism D. The secondary conduits 44 are placed in compression when a tensile force is placed on the secondary cable 42. Thus, the only difference between the primary cable 22 and the secondary cable 42 is on which end the force is placed on the cable. For the primary cable 22, the tensile force is typically initiated at the distal end. For the secondary cable 42 the tensile force is typically initiated at the proximal end 50. Just like the primary cable 22, the conduit 44 which surrounds the secondary cable 42 has a fixed point 46, 48 on either end. The fixed points 48 are contained in swivel connectors 49.

Between the primary and the secondary cable and conduit assemblies 20, 40 is a hollow housing 60. The hollow housing 60 includes and a first or upper portion 62 and a second or lower portion 64. Mounting clips 70 may be used for mounting the housing to a fixed surface. Within the upper portion 62 is a lost motion slider 66. The lost motion slider 66 is attached to the primary cable 22. When a tensile force is placed on the primary cable 22, the lost motion slider 66 is able to travel within the upper portion of the housing 62. Because the lost motion slider 66 is also attached to the secondary cables 42, motion of the primary cable 22 is transferred to the secondary cables 42.

The lower portion 64 of the hollow housing 60 includes another open space. Within this open space are contained two compression springs 68, one formed around each of the secondary cables 62. The secondary cables 62 are also attached to the lost motion slider 66 so that when the lost motion slider 66 is caused to move by a force from the primary cable 22, that motion is transferred to the secondary cables 42, thus placing a tension force on the secondary cables 42. The tension force on the secondary cables 42 places a compression force on the secondary conduits 44 surrounding the secondary cables 42. The compression springs 68 within the lower portion 64 of the housing 60 are sized so that when the compressive load on the secondary conduit 62 is greater that then preload on the springs 68, which preload is obtained by installing the springs 68 in a compressed state, the compression springs 68 will compress further to relieve the tension load on the secondary cable 62.

Operation

A still better understanding of the integrated compensator model 10 of the present invention by a description of its operation. When motion is initiated by movement of a lever 102, or similar device for receiving a manual input, a tensile load is imparted onto the primary cable 22. This tensile load is transmitted to the lost motion slider 66 contained within the upper portion 62 of the housing 60. The force on the lost most motion slider 66 causes it to move within the upper portion 62 of the housing 60. This movement of the lost motion slider 66 results in any slack in the primary and secondary cables 22, 42 being taken up and a tensile load being placed on both the primary and secondary cables 22, 42. The tensile load on the secondary cables 42 actuates whatever mechanism is attached to the distal end of the secondary cables 42.

As may be seen in the drawing figures, the primary cable 22 and each of the two secondary cables 42 is enclosed in a conduit 44. The tensile loads on the primary and secondary cables 22, 42 do two things. First, the primary and secondary cables 22, 42, along with the conduits 22, 44 which surround them exhibit a tendency to move into a straight line configuration as opposed to a curved or arcuate configuration. Second, the conduits 24, 44 which surround the primary and secondary cables 22, 42 enter into a state of compression.

Focusing now on the mechanism attached to the distal end of the secondary cables 22, 42—if that mechanism hits a design stop or if for some reason is blocked prior to the lever or movement mechanism on the distal end of the primary cable 22 hitting its design stop, the tensile load on all cables will increase. This increase in tensile load on the cables further increases the compressive load on the conduits 24, 44 which surround the primary and secondary cables 22, 42. When the compressive load on the conduits surrounding the secondary cables 42 exceeds the preload on the springs 68 contained within the lower portion 64 of the housing 66, the springs 68 will compress, thus relieving the load on the cables 22, 42.

The disclosed integrator compensator module 10 is sized to be small and unobtrusive. Thus, it may be located away from the small spaces typically found near the tracks which guide the travel of the seats typically found in most vehicles. The compression springs 68 protect the cables from excessive loading, risk of fatigue, and breakage. This protection is provided by the compression spring 68 which surrounds each secondary cable 62. The lost motion slider 66 acts a motion splitter to transfer the motion of the primary cable 22 to the two secondary cables 42. Those of ordinary skill in the art will understand that while the preferred embodiment of the integrated compensator module of the present invention is shown with two secondary cables, multiple secondary cables may be used without departing from the scope of the invention.

While the present system and method has been disclosed according to the preferred embodiment of the invention, those of ordinary skill in the art will understand that other embodiments have also been enabled. Such other embodiments shall fall within the scope and meaning of the appended claims.

What is claimed is:

1. An integrated compensator module comprising:
   a primary cable and conduit assembly;
   at least two secondary cable and conduit assemblies;
   a slider block for connecting said primary cable to at least two secondary cables in said at least two secondary cable and conduit assemblies;

a hollow housing, said hollow housing containing a first portion and a second portion, said first portion of said hollow housing constructed and arranged to contain and guide motion of said slider block; and a compression spring contained within said second portion of said housing and substantially surrounding at least one of said at least two secondary cables;

whereby when a compression load is placed on secondary conduits in said at least two secondary cable and conduit assemblies, said compression spring will compress.

2. The integrated compensator module as defined in claim 1 wherein there is a pre-load on said compression spring.

3. The integrated compensator module as defined in claim 1 wherein said hollow housing includes a fixed mounting for a proximal end of a conduit portion of said primary cable and conduit assembly and a fixed mounting for proximal ends of conduit portions of said secondary cable and conduit assemblies.

4. A vehicle seat comprising:
   a seat portion;
   a back portion; and
   means for controlling and adjusting a position of a seat within a vehicle;
   said means for controlling and adjusting the position of the seat within the vehicle further including a cable actuated integrated compensator module, said cable actuated integrated compensator module further including:
      an integrated compensator module comprising:
         a primary cable and conduit assembly;
         at least two secondary cable and conduit assemblies;
         a slider block for connecting a primary cable in said primary cable and conduit assembly to at least two secondary cables in said at least two secondary cable and conduit assemblies; and
         a hollow housing, said hollow housing containing a first portion and a second portion;
         said first portion of said hollow housing constructed and arranged to contain and guide motion of said slider block;
         said second portion of said housing constructed and arranged to contain a compression spring substantially surrounding at least one of said at least two secondary cables;
         whereby when a compressive load is placed on said secondary conduits, said compression springs will compress.

5. The vehicle seat as defined in claim 4 wherein there is a pre-load on said compression springs.

6. The vehicle seat as defined in claim 4, wherein said hollow housing includes a fixed mounting for a proximal end of a conduit portion of said primary cable and conduit assembly and a fixed mounting for a proximal end of conduit portions of said secondary cable and conduit assemblies.

* * * * *